# United States Patent
Mutoh et al.

(10) Patent No.: US 9,468,150 B2
(45) Date of Patent: Oct. 18, 2016

(54) AIR BLOWER

(71) Applicant: YAMABIKO CORPORATION, Ome-shi, Tokyo (JP)

(72) Inventors: Hiroki Mutoh, Tokyo (JP); Tetsuya Kawamoto, Tokyo (JP); Yusuke Kinoshita, Tokyo (JP); Shota Nishihara, Tokyo (JP)

(73) Assignee: Yamabiko Corporation (JP)

( * ) Notice: Subject to any disclaimer, the term of this patent is extended or adjusted under 35 U.S.C. 154(b) by 0 days.

(21) Appl. No.: 14/871,404

(22) Filed: Sep. 30, 2015

(65) Prior Publication Data
US 2016/0095280 A1 Apr. 7, 2016

(30) Foreign Application Priority Data

Oct. 3, 2014 (JP) .................................. 2014-205028

(51) Int. Cl.
*A01G 1/12* (2006.01)
(52) U.S. Cl.
CPC .................................... *A01G 1/125* (2013.01)
(58) Field of Classification Search
CPC ......... A01G 1/125; A47L 5/365; A47L 9/00; A47L 5/362
See application file for complete search history.

(56) References Cited

U.S. PATENT DOCUMENTS

| 4,913,112 | A | * | 4/1990 | Iida | F02B 63/02 123/195 R |
| 5,349,721 | A | * | 9/1994 | Iida | A47L 5/22 15/327.2 |
| 6,004,093 | A | * | 12/1999 | Ishikawa | A47L 5/12 15/405 |
| 6,077,033 | A | * | 6/2000 | Ishikawa | F04D 17/12 15/405 |
| 7,370,388 | B2 | * | 5/2008 | Yuasa | F02M 35/024 123/41.56 |
| 2004/0216262 | A1 | * | 11/2004 | Taomo | A01G 1/125 15/327.5 |
| 2009/0038106 | A1 | * | 2/2009 | Wada | E01H 1/0809 15/326 |
| 2013/0047367 | A1 | * | 2/2013 | Patrono | A47L 5/22 15/300.1 |
| 2015/0282435 | A1 | * | 10/2015 | Mutoh | E01H 1/0809 15/405 |

FOREIGN PATENT DOCUMENTS

JP 45-32032 B2 6/2010

* cited by examiner

*Primary Examiner* — Dung Van Nguyen
(74) *Attorney, Agent, or Firm* — Merchant & Gould P.C.

(57) ABSTRACT

An air blower discharges an air flow generated by rotation of a fan from an outlet port of a fan case. An engine and a carburetor are disposed opposing to an outer surface of the fan case. An engine cover (partition) for separating a space in which the engine is disposed from another space in which the carburetor is disposed is provided. The outer surface including a region having a ventilation hole formed through a wall of the fan case, the region opposing to the space in which the carburetor is disposed and the ventilation hole being directed toward the carburetor.

20 Claims, 5 Drawing Sheets

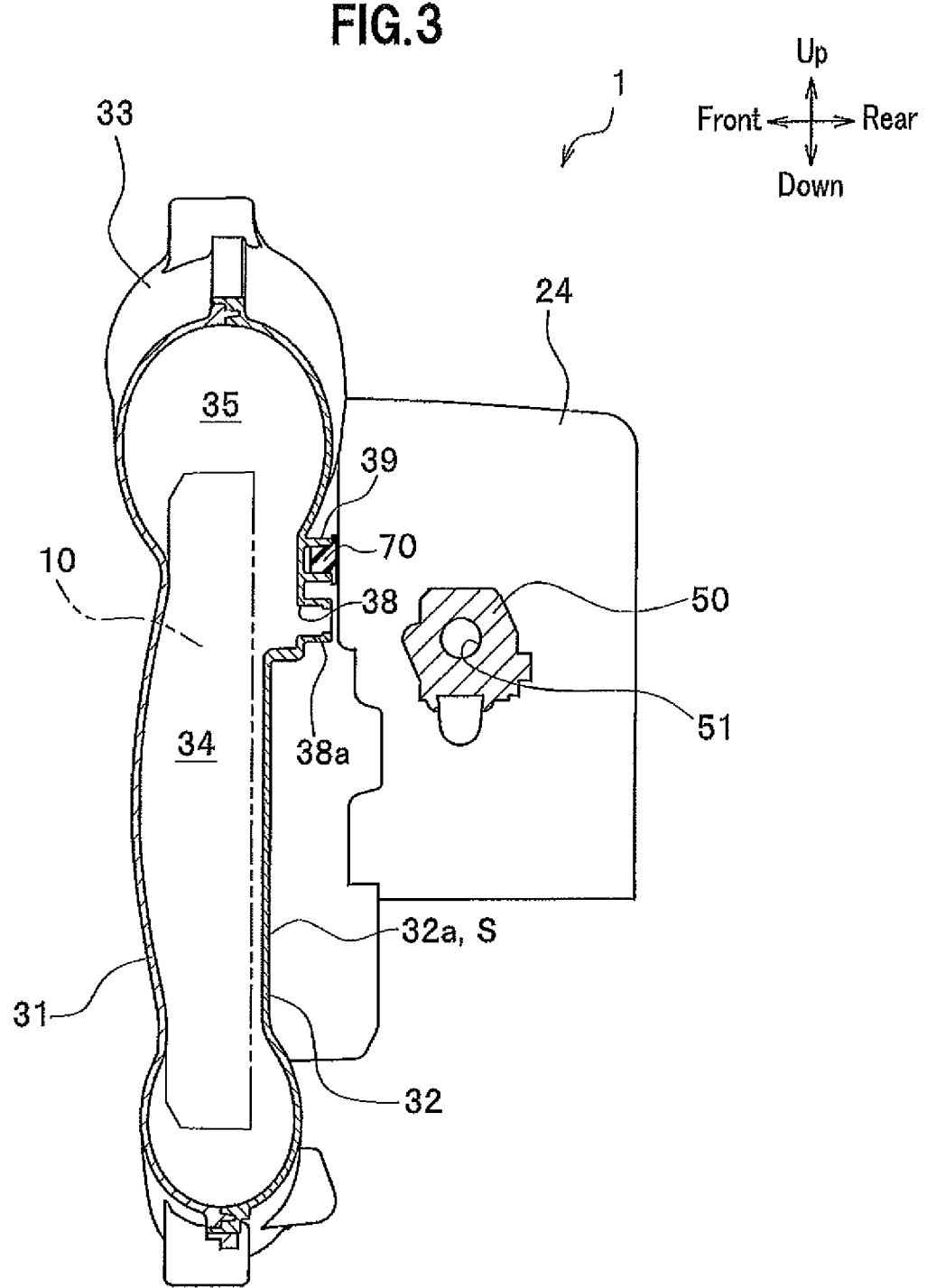

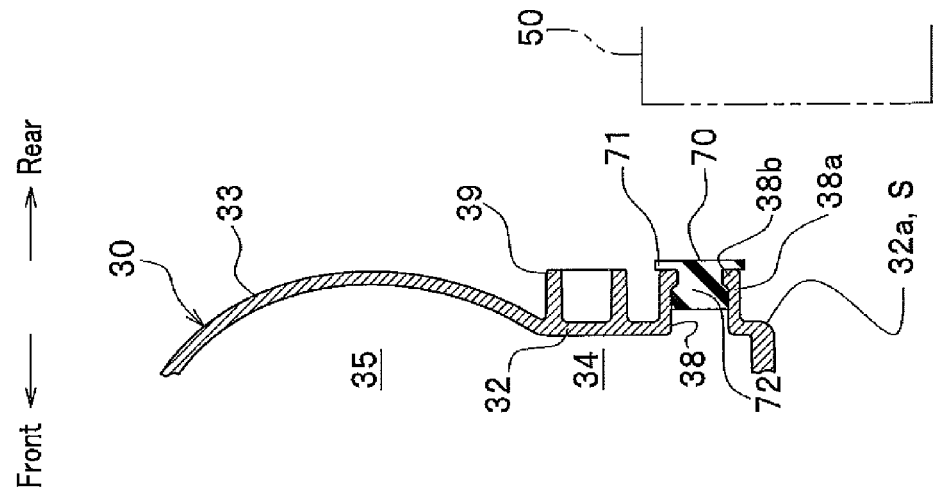
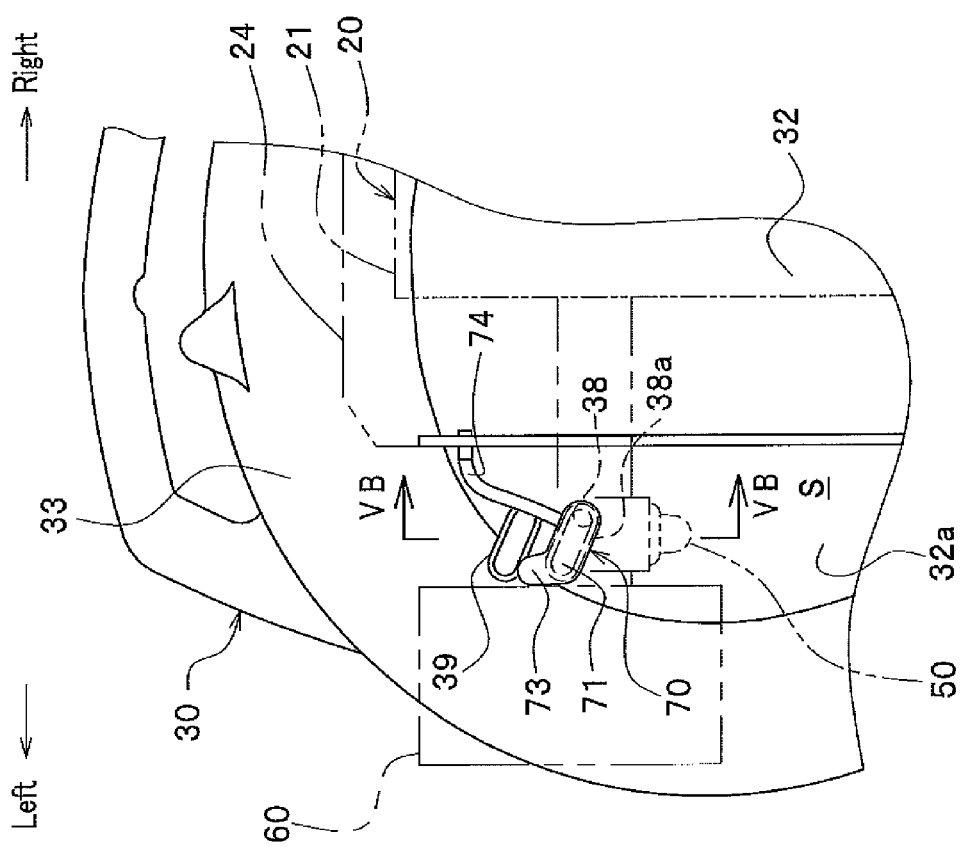

AIR BLOWER

CROSS REFERENCE TO RELATED APPLICATIONS

This application claims priority to Japanese Patent Application No. 2014-025028, filed on Oct. 3, 2014, the entire content of which is incorporated herein by reference.

BACKGROUND OF THE INVENTION

1. Field of the Invention

This invention relates to an air blower discharging an air flow.

2. Description of the Related Art

A portable air blower blows away a pile of dead leaves and twigs on the ground to sweep the ground. The portable air blower includes a fan housed in a fan case and an engine for rotating the fan. The air blower discharges an air flow generated by rotation of the fan from an outlet pipe connected to the outlet port of the fan case.

When the air blower described above is used in winter at low outside air temperature, what we call icing could occur, whereby water contained in the air passing through a ventilation passage in a carburetor is frozen due to heat of evaporation of fuel. For this reason, some air blowers etc. include a driving device which discharges air having been used for cooling the engine from a space on the engine side to a periphery of the carburetor to warm up the carburetor. (See, for example, the patent document 1: Japanese Patent No.: 4532032.)

SUMMARY OF THE INVENTION

However, in the conventional drive device described above, the air having passed through the periphery of the engine has a very high temperature. Therefore, the temperature of the carburetor could rise excessively, resulting in inappropriate generation of an air-fuel mixture and unstable operation.

An object of this invention is to solve the problem mentioned above and provide an air blower capable of preventing the carburetor from icing at a low outside air temperature and suppressing a temperature rise of the carburetor.

In order to solve the problem above, this invention provides an air blower comprising: a fan case defining an outlet port and an outer surface; a fan housed in the fan case, the fan generating an air flow to be discharged from the outlet port; an engine for rotating the fan, the engine being disposed opposing to the outer surface; a carburetor disposed opposing to the outer surface; and a partition separating a space in which the carburetor is disposed from another space in which the engine is disposed, the outer surface including a region having a ventilation hole formed through a wall of the fan case, the region opposing to the space in which the carburetor is disposed, and the ventilation hole being directed toward the carburetor.

Under this configuration, the ventilation hole is directed toward the carburetor so that air pressurized by rotation of the fan in the fan case is discharged from the ventilation hole to the carburetor. The temperature of air pressurized in the fan case of the air blower is 5 degrees Celsius higher than the outside air. The carburetor is prevented from icing using this hotter air.

Also, unlike air in a space on the engine side, the temperature of the air pressurized in the fan case does not rise excessively. In addition, air in a space on the engine side is shut off by the partition and does not flow to the periphery of the carburetor. Therefore, an excessive temperature rise of the carburetor is suppressed and an air-fuel mixture is generated appropriately in the carburetor.

Dust deposited on movable parts of the carburetor is blown away by air discharged from the ventilation hole. This invention includes a configuration wherein the ventilation hole is directed to the carburetor via a pipe and a peripheral wall.

With respect to the air blower described above, the ventilation hole may be formed in a region defined by projecting the carburetor onto the outer surface.

With respect to the air blower mentioned above, a guide wall extending toward the carburetor may be formed at the opening edge of the ventilation hole. Under these configurations, the air inside the fan case is certainly blown from the ventilation hole to the carburetor.

Furthermore, when the ventilation hole is formed substantially at the same height as the ventilation passage in the carburetor, the carburetor is prevented from icing more effectively because air in the fan case is blown to a wall of the ventilation passage in the carburetor.

With respect to the air blower described above, when a lid for opening or closing the ventilation hole is provided, an excessive temperature rise of the carburetor at a high outside temperature is prevented by closing the ventilation hole with the lid.

With respect to the air blower described above, if the lid is freely attachable and detachable to the ventilation hole, it is preferable that a holder be formed near the ventilation hole such that the lid is freely attachable and detachable to the holder.

Under this configuration, when the lid is removed from the ventilation hole, the lid is attached to the holder to prevent loss of the lid.

With respect to the air blower described above, the fan case includes a housing space to house the fan and an air guide path which is formed along the periphery of the housing space and whose internal periphery is in communication with the housing space. In this case, it is preferable that the ventilation hole be in communication with the housing space.

Under this configuration, the air in the fan case can be discharged from the ventilation hole without influencing an air flow passing through the air guide path and an amount of air to be sent. Therefore, the carburetor is prevented from icing without lowering the air blowing performance.

Also, since the pressure of the air in the housing space is lower than that of the air in the air guide path, the speed of the air discharged from the ventilation hole hardly rise. For this reason, sounds made when air passes through the ventilation hole are reduced.

With respect to the air blower described above, when an engine cover covering the engine is used as a partition, the space housing the engine and the space housing the carburetor can certainly be separated.

With respect to the air blower described above, it is preferable that the space in which the carburetor is disposed be exposed to the outside to prevent recirculation of the hot air around the carburetor, thereby suppressing a temperature rise of the carburetor.

The air blower according to the present invention prevents the carburetor from icing at a low outside air temperature and suppresses an excessive temperature rise of the carburetor. Therefore, the carburetor operates normally, an air-fuel mixture (fuel atomization) is appropriately generated by the carburetor, and the influence of the outside temperature during operation is reduced.

BRIEF DESCRIPTION OF THE DRAWINGS

FIG. 3 is a III-III cross sectional view of FIG. 1 describing an air blower according to an embodiment of the present invention.

FIG. 4A is a front view and FIG. 4B is a IVB-IVB cross sectional view.

FIGS. 5A and 5B describe an air blower according to an embodiment of the present application with the ventilation hole closed. FIG. 5A is a front view and FIG. 5B is a VB-VB cross sectional view.

DESCRIPTION OF THE PREFERRED EMBODIMENTS

Details of an embodiment of the present invention will be explained referring to figures as needed. In the following descriptions, the directions: front, rear, right, and left refer to the directions indicated in each figure. Each direction is defined only for the sake of explaining the structure of the air blower and does not limit the structure of this invention.

Figure 1:
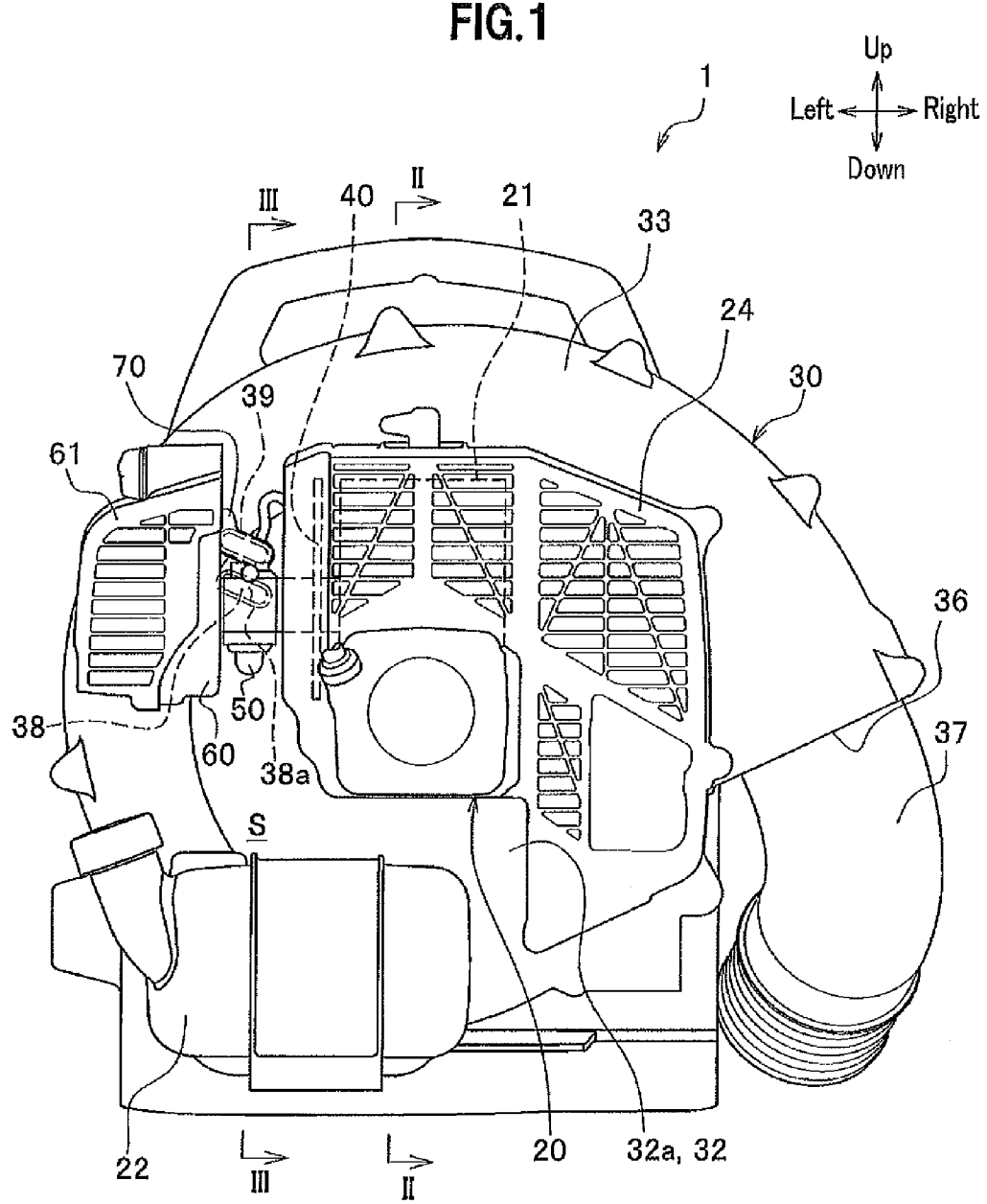
FIG. 1 is a front view of an air blower according to an embodiment of the present invention.

An air blower 1 according to an embodiment described in FIG. 1 can be carried by an operator on his back when it is mounted on a backpack flame (not shown). The air blower 1 blows away dead leaves and twigs by discharging high speed air flow toward the ground from a discharging pipe (not shown) connected to an outlet pipe 37 which is further connected to a fan case 30, allowing the operator to sweep the ground.

Figure 2:
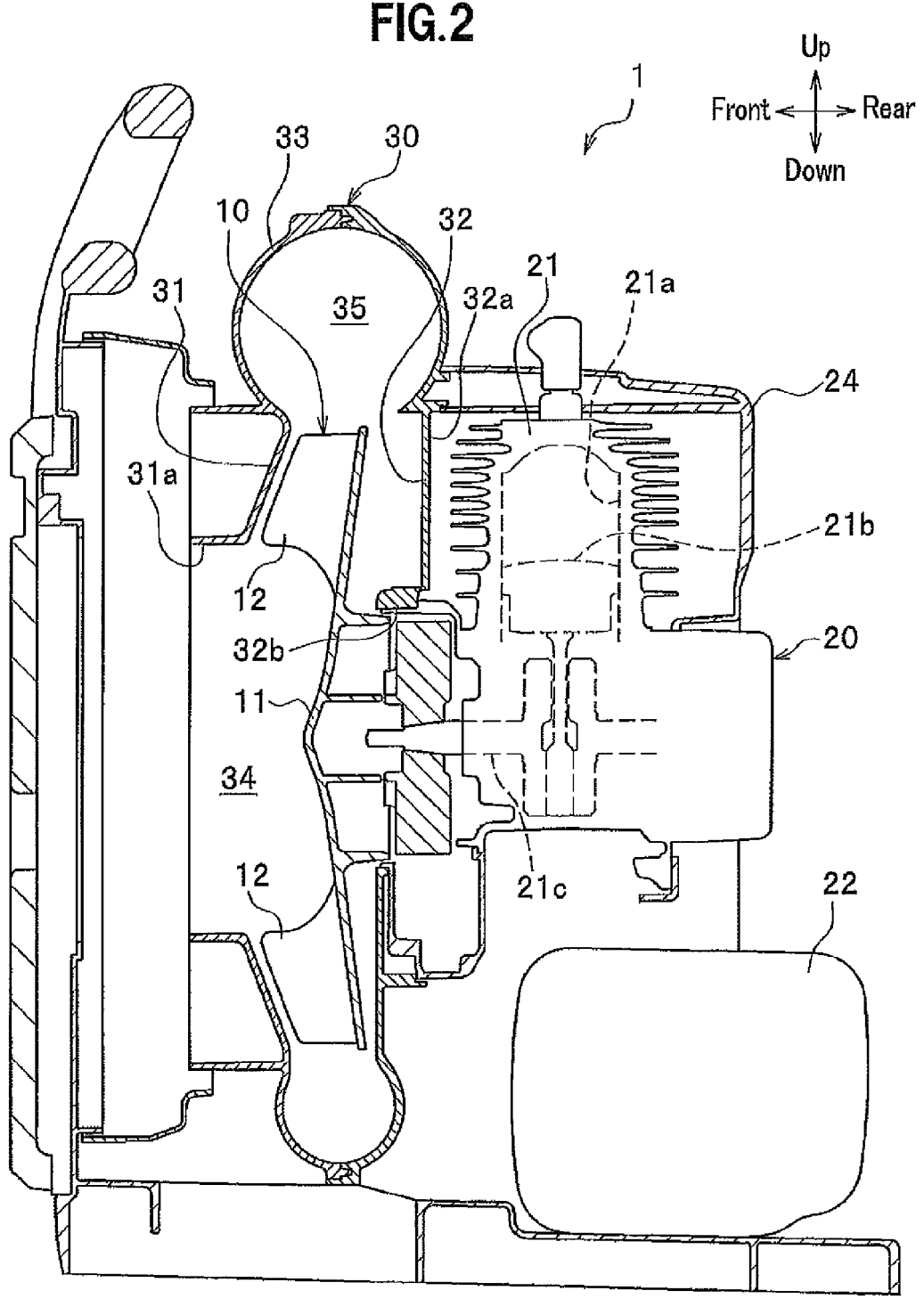
FIG. 2 is a II-II cross sectional view of FIG. 1 describing an air blower according to an embodiment of the present invention

As shown in FIG. 2, the air blower 1 includes a fan 10 housed in the fan case 30 and an engine 20 for rotating the fan 10. The air blower 1 rotates the fan 10 in the fan case 30 to generate a high speed air flow in the fan case 30.

As shown in FIG. 1, the air blower 1 discharges an air flow generated in the fan case 30 to the outside via the outlet pipe 37 and the discharging pipe (not shown) both connected to the fan case 30.

As shown in FIG. 2, the engine 20 is an internal combustion engine including a cylinder block 21 in which a cylinder 21a is formed. A fuel tank 22 is provided below the cylinder block 21.

A rotary shaft 21c protrudes from a lower part of the cylinder block 21 toward the front side. The rotary shaft 21c is a crank shaft of the engine 20. The vertical movement of a piston 21b in the cylinder 21a is converted to a rotational movement of the rotary shaft 21c.

An engine cover 24 (referred to as "partition" in the claims) made of resin is provided for the engine 20 such that the engine 20 is covered with the engine cover 24. In other words, the engine 20 is disposed in a space enclosed by the engine cover 24.

As shown in FIG. 1, a carburetor 50 supplying an air-fuel mixture to the cylinder 21a (See FIG. 2) is installed on the left side of the upper part of the cylinder block 21.

Fuel pumped from the fuel tank 22 by a pump (not shown) is mixed with air in a ventilation passage 51 (See FIG. 3) of the carburetor 50, and the air-fuel mixture is supplied into the cylinder 21a. (See FIG. 2.)

An air cleaner 60 is installed on the left side of the carburetor 50. The air having passed through the air cleaner 60 is supplied to the carburetor 50. The air cleaner 60 is covered by an air cleaner cover 61 made of resin.

In this embodiment, the carburetor 50 is disposed between the engine cover 24 and the air cleaner cover 61 and is exposed to an outside space. In other words, the space in which the carburetor 50 is disposed is opened to the outside space. The carburetor 50 is connected to the cylinder block 21 via an opening (not shown) formed on the left sidewall of the engine cover 24. The engine cover 24 includes a gasket 40 for filling a gap between the carburetor 50 and the cylinder block 21.

As shown in FIG. 2, the fan 10 is a rotary wing installed on the front side of the engine 20. The fan 10 is installed at the end of the rotary shaft 21c and rotates when the rotary shaft 21c rotates. The fan 10 includes a fixation part 11 having a shape like a plate and a plurality of wings 12 formed on the periphery of the fixation part 11. The end of the rotary shaft 21c is fixed at the center of the fixation part 11.

The fan case 30 is a resin-made housing including a front wall 31 having a plate shape disposed on the front side, a rear wall 32 having a plate shape disposed on the rear side, and a peripheral wall 33 formed along the outer peripheral edge of the front wall 31 and the rear wall 32. An intake port 31a which is opened is provided at the center of the front wall 31.

The fan case 30 according to this embodiment has the front side portion (a portion on the front wall 31 side) and the rear side portion (a portion on the rear wall 32 side).

A housing space 34 for housing the fan 10 is formed between the front wall 31 and the rear wall 32 of the fan case 30. The rear wall 32 is disposed on the front side of the engine 20 and is fixed to the cylinder block 21 with a fastener such as a bolt. As shown in FIG. 2, a rear side face 32a (referred to as an outer surface in the claims) of the rear wall 32 is opposed to the engine 20 and the carburetor 50.

An insertion hole 32b having a circular shape penetrates the rear wall 32 at the central part. The rotary shaft 21c is inserted into the insertion hole 32b. The end of the rotary shaft 21c protrudes into a housing space 34. In the housing space 34, the fan 10 is installed at the end of the rotary shaft 21c.

An air guide path 35 is formed inside the peripheral wall 33. The air guide path 35 is formed along the outer periphery of the housing space 34, and the internal periphery of the air guide path 35 is in communication with the housing space 34.

As shown in FIG. 1, an outlet port 36 having a cylindrical shape is formed on the right side of the periphery wall 33. The outlet port 36 protrudes obliquely downward and is in communication with the air guide path 35. (See FIG. 2.) The base edge of the outlet pipe 37 having a cylindrical shape is internally fitted into the outlet port 36.

In the air blower 1 described above, as shown in FIG. 2, when the engine 20 rotates the fan 10 in the housing space 34 of the fan case 30, high speed air flow is generated in the fan case 30, and air is taken into the housing space 34 from the intake port 31a.

The air in the fan case 30 is guided to the outlet pipe 37 (See FIG. 1.) via the air guide path 35 and the outlet port 36 and is subsequently discharged to the outside from the end of the outlet pipe 37.

In this embodiment, as shown in FIG. 1, a space in which the engine 20 is disposed is separated by the engine cover 24 from another space in which the carburetor 50 is disposed.

A ventilation hole 38 penetrating the rear wall 32 is formed in a region S on the rear side face 32a of the fan case 30, the region S opposing to the space in which the carburetor 50 is disposed. (See FIG. 3.) In other words, the ventilation hole 38 is formed on the rear side face 32a such that the ventilation hole 38 is disposed on the carburetor 50 side (left side) of the engine cover 24.

The ventilation hole 38 is formed on the rear wall 32 which is flat and is retreated inward from the peripheral wall 33. The ventilation hole 38 is in communication with the housing space 34. As shown in FIG. 4A, the ventilation hole 38 is a long hole extending in the left-right direction and is slanted such that the left end is higher than the right end.

The ventilation hole 38 is formed opposing to the carburetor 50. Specifically, the ventilation hole 38 is positioned in a region defined by projecting the carburetor 50 onto the rear side face 32a, and the ventilation hole 38 and the carburetor 50 overlap when the fan case 30 is viewed from the front.

As shown in FIG. 3, the ventilation passage 51 through which an air-fuel mixture passes is formed in the carburetor 50. The ventilation hole 38 is formed within a region defined by projecting the ventilation passage 51 onto the rear side face 32a.

Figure 4B:
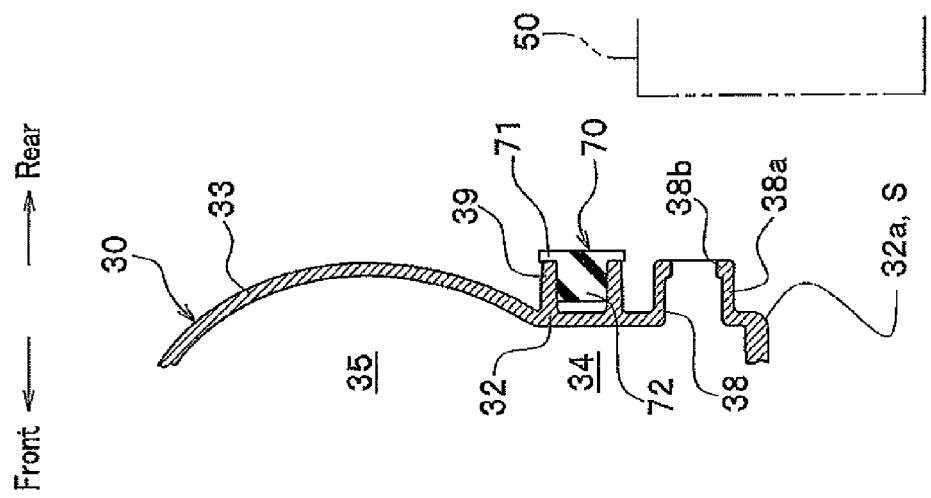
FIGS. 4A and 4B describe an air blower according to an embodiment of the present application with the ventilation hole opened.
Figure 4A:
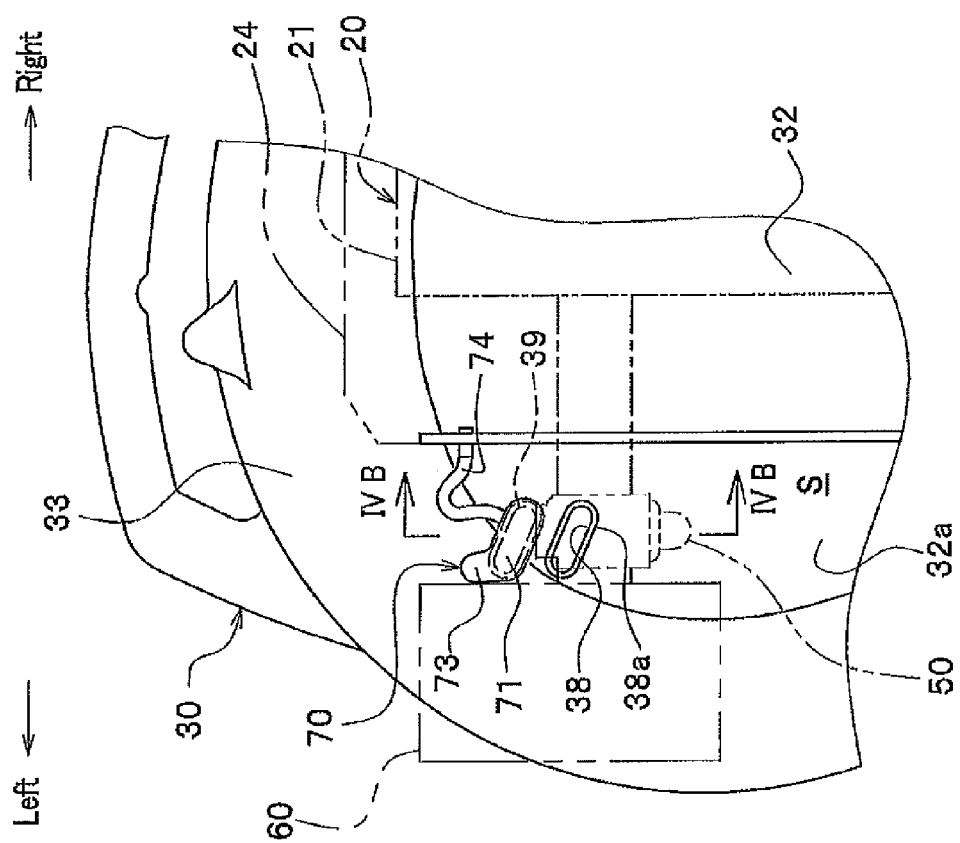

As shown in FIGS. 4A and 4B, a guide wall 38a having a cylindrical shape is provided on the rear opening edge of the ventilation hole 38. The guide wall extends and protrudes toward the carburetor 50.

In this embodiment, the projection amount of the guide wall 38a is made small so that the guide wall 38a does not contact the carburetor 50.

The air blower 1 according to this embodiment has a lid 70 for opening and closing the ventilation hole 38. The lid 70 is made of resin and is freely attachable and detachable to the guide wall 38a. As shown in FIG. 5B, the lid 70 includes a blocker 71 having a flat plate shape that closes the opening on the rear side of the guide wall 38a and an inserting part 72 which is inserted into the guide wall 38a. As shown in FIG. 5A, the blocker 71 is formed in an elliptic circular shape and is slightly greater than the rear edge portion of the guide wall 38a.

As shown in FIG. 5B, a projection 38b projecting inwardly is formed on the rear opening edge of the guide wall 38a. The projection 38b locks the inserting part 72, thereby forming a stopper to prevent the lid 70 from coming off from the guide wall 38a.

As shown in FIG. 5A, a finger grip 73 protrudes from the outer peripheral edge of the blocker 71 of the lid 70. The lid 70 is installed on the guide wall 38a such that the finger grip 73 is located on the upper side.

When the lid 70 is removed from the guide wall 38a, a user picks the finger grip 73 so that he can easily detach the lid 70 from the guide wall 38a.

A strap 74 extends from the outer peripheral edge of the blocker 71 of the lid 70.

The end of the strap 74 is attached to a portion of the rear side face 32a, the portion being connected to the engine cover 24. The strap 74 prevents drop or loss of the lid 70, when the lid 70 has been released from the guide wall 38a.

A holder 39 is formed above the guide wall 38a (the ventilation hole 38) on the rear side face 32a, wherein the lid 70 is freely attachable and detachable to the holder 39. Similar to the guide wall 38a, the holder 39 is formed integrally with the peripheral wall 33. As shown in FIG. 4B, the lid 70 can be attached to the holder 39 by inserting the inserting part 72 of the lid 70 into the holder 39.

Preferably, the inserting part 72 should not protrudes into the fan case 30 when the inserting part 72 of the lid 70 is inserted into the holder 39.

With respect to the air blower 1 described above, as shown in the FIG. 3, the air pressurized in the fan case 30 by rotation of the fan 10 is discharged from the ventilation hole 38 to the carburetor 50.

At this time, air in the fan case 30 is directed from the ventilation hole 38 to the carburetor 50 by the guide wall 38a, thus the air inside the fan case 30 is certainly discharged to the carburetor 50.

When air is pressurized in the fan case 30, the temperature of the air becomes 5 degrees Celsius higher than that of the outer space. Therefore, when the air blower 1 is used at a low outside air temperature, the warm air discharged from the ventilation hole 38 is utilized to prevent the carburetor 50 from icing.

In the air blower 1 of this embodiment, the ventilation hole 38 is in communication with the housing space 34. Therefore, the air in the fan case 30 is discharged from the ventilation hole 38 without influencing the air flow passing through the air guide path 35 and the amount of air to be sent. Therefore, the carburetor 50 is prevented from icing without lowering the performance of the air blower 1 to discharge air. Particularly, in this embodiment, the air in the fan case 30 is discharged against a rear wall of the ventilation passage 51 of the carburetor 50, thus a temperature decrease at a location where icing occurs is effectively suppressed.

Since the pressure of an air flow in the housing space 34 is lower than that of an air flow in the air guide path 35, the speed of the air discharged from the ventilation hole 38 hardly increases even if the width of the opening of the ventilation hole 38 is small. Therefore, sounds made when air passes through the ventilation hole 38 are reduced.

Unlike the air having passed through the periphery of the engine 20, the temperature of the air pressurized in the fan case 30 does not rise excessively. Furthermore, air in a space on the engine 20 side is blocked by the engine cover 24 and does not flow into the periphery of the carburetor 50. Therefore, an excessive temperature rise of the carburetor 50 is prevented and an air-fuel mixture is generated appropriately by the carburetor 50 under various circumstances.

Dust deposited on movable parts of the carburetor 50 is blown away by air discharged from the ventilation hole 38.

Furthermore, the air blower 1 of this embodiment has a lid 70 for opening and closing the ventilation hole 38 as shown in FIGS. 5A and 5B. Under high outside temperature environment (e.g. outside temperature of about 40 degrees Celsius), blocking the ventilation hole 38 by attaching the lid 70 to the guide wall 38a prevents a temperature rise of the carburetor 50.

As shown in FIGS. 4A and 4B, when the lid 70 is released from the guide wall 38a, loss of the lid 70 is prevented by attaching the lid 70 to the holder 39 disposed above the ventilation hole 38.

As shown in FIG. 4A, the ventilation hole 38 extends in the left-right direction along the ventilation passage 51 (see FIG. 3) of the carburetor 50 and is oblique such that the left end is higher than the right end. Therefore, the ventilation hole 38 effectively increases the temperature of the carburetor 50. Since one end of the ventilation hole 38 is disposed at a height equivalent to a height of an upper portion of the carburetor 50, a user can easily attach or detach the lid 70.

With respect to the air blower 1 of this embodiment, as shown in FIG. 3, icing of the carburetor 50 at low outside air temperature is prevented, excessive temperature rise of the carburetor 50 is suppressed, generation of an air-fuel mixture (atomization of fuel) in the carburetor 50 is properly performed, and the carburetor 50 is operated appropriately. Therefore, the influence of an outside air temperature is mitigated during operation of the air blower 1, enabling usage under various environments.

As above, an embodiment of this invention has been explained. However, this invention is not limited to the embodiment above and can be modified as needed without departing from the spirit of the invention.

In this embodiment, as shown in FIG. 4A, the holder 39 and the guide wall 38*a* have the same shape. However, the shape of the holder 39 is not limited if the lid 70 can be attached to the holder 39. For example, the holder 39 may be formed by a pair of upper and lower walls or right and left walls, and the lid 70 may be put between the two walls.

In this embodiment, the guide wall 38*a* is formed on the opening edge of the ventilation hole 38. However, it is not necessary to form the guide wall 38*a*. In this embodiment, the guide wall 38*a* is formed on the peripheral wall. However, the shape of the guide wall 38*a* is not limited to a continuous ring shape, if air discharged from the ventilation hole 38 can be directed to the carburetor 50.

In this embodiment, the holder 39 is disposed above the ventilation hole 38. However, the position of the holder 39 with respect to the ventilation hole 38 is not limited. Furthermore, the holder 39 may be formed on components other than the fan case 30 such as the engine cover 24 or the air cleaner 60.

Components such as the engine cover 24 or the air cleaner 60 shown in FIG. 1 may not be installed on the fan case 30.

In this embodiment, the ventilation hole 38 is closed by the lid 70 as shown in FIGS. 5A and 5B. However, the ventilation hole 38 may be opened or closed by a movable lid such as a slide opening/closing type, hinge opening/closing type or shutter opening/closing type lid.

In this embodiment, the ventilation hole 38 is formed on the rear wall 32 and is in communication with the housing space 34 as shown in FIG. 3. However, the ventilation hole 38 may be formed on the peripheral wall 33 and may be in communication with the air guide path 35.

In this embodiment, the space in which the engine 20 is disposed and the space in which the carburetor 50 is disposed are separated by the engine cover 24 as shown in FIG. 1. However, the configuration of a partition separating the two spaces is not limited. For example, a partition may be formed by providing a partition wall or partition plate on the rear side face 32*a* of the fan case 30.

In this embodiment, a backpack type air blower 1 has been explained as shown in FIG. 1 as an example of the present invention. However, this invention may also be applied to a handheld type air blower which can be carried by an operator by hand.

What is claimed is:

1. An air blower comprising:
   a fan case defining an outlet port and an outer surface;
   a fan housed in the fan case, the fan generating an air flow to be discharged from the outlet port;
   an engine for rotating the fan, the engine being disposed opposing to the outer surface;
   a carburetor disposed opposing to the outer surface; and
   a partition separating a space in which the carburetor is disposed from another space in which the engine is disposed,
   the outer surface including a region having a ventilation hole formed through a wall of the fan case, the region opposing to the space in which the carburetor is disposed, and
   the ventilation hole being directed toward the carburetor.

2. The air blower according to claim 1,
   wherein the ventilation hole is formed in a region defined by projecting the carburetor onto the outer surface.

3. The air blower according to claim 2,
   further comprising a guide wall on an opening edge of the ventilation hole, the guide wall extending toward the carburetor.

4. The air blower according to claim 3,
   further comprising a lid for opening and closing the ventilation hole.

5. The air blower according to claim 4,
   further comprising a holder which is formed near the ventilation hole,
   wherein the lid is freely attachable and detachable to the ventilation hole and the holder.

6. The air blower according to claim 3,
   wherein the fan case includes both a housing space housing the fan and an air guide path formed along the outer periphery of the housing space; and
   wherein both the ventilation hole and the inner periphery of the air guide path are in communication with the housing space.

7. The air blower according to claim 2,
   further comprising a lid for opening and closing the ventilation hole.

8. The air blower according to claim 7,
   further comprising a holder which is formed near the ventilation hole,
   wherein the lid is freely attachable and detachable to the ventilation hole and the holder.

9. The air blower according to claim 2,
   wherein the fan case includes both a housing space housing the fan and an air guide path formed along the outer periphery of the housing space; and
   wherein both the ventilation hole and the inner periphery of the air guide path are in communication with the housing space.

10. The air blower according to claim 1,
    further comprising a guide wall formed on an opening edge of the ventilation hole, the guide wall extending toward the carburetor.

11. The air blower according to claim 10,
    further comprising a lid for opening and closing the ventilation hole.

12. The air blower according to claim 11,
    further comprising a holder which is formed near the ventilation hole,
    wherein the lid is freely attachable and detachable to the ventilation hole and the holder.

13. The air blower according to claim 10,
    wherein the fan case includes both a housing space housing the fan and an air guide path formed along the outer periphery of the housing space; and
    wherein both the ventilation hole and the inner periphery of the air guide path are in communication with the housing space.

14. The air blower according to claim 1,
    further comprising a lid for opening and closing the ventilation hole.

15. The air blower according to claim 14,
wherein the fan case includes both a housing space housing the fan and an air guide path formed along the outer periphery of the housing space; and
wherein both the ventilation hole and the inner periphery of the air guide path are in communication with the housing space.

16. The air blower according to claim 14,
further comprising a holder which is formed near the ventilation hole, wherein the lid is freely attachable and detachable to the ventilation hole and the holder.

17. The air blower according to claim 16,
wherein the fan case includes both a housing space housing the fan and an air guide path formed along the outer periphery of the housing space; and
wherein both the ventilation hole and the inner periphery of the air guide path are in communication with the housing space.

18. The air blower according to claim 1,
wherein the fan case includes both a housing space housing the fan and an air guide path formed along the outer periphery of the housing space; and
wherein both the ventilation hole and the inner periphery of the air guide path are in communication with the housing space.

19. The air blower according to claim 1,
wherein the partition is an engine cover covering the engine.

20. The air blower according to claim 1,
wherein the space in which the carburetor is disposed is opened to the outside.

* * * * *